United States Patent [19]
Brandon et al.

[11] Patent Number: 5,698,304
[45] Date of Patent: Dec. 16, 1997

[54] POLYMER COATED GLASS FIBER MAT

[75] Inventors: Ralph E. Brandon, Newark; Kimberley A. Householder, Pickerington, both of Ohio

[73] Assignee: Owens-Corning Fiberglas Technology, Inc., Summit, Ill.

[21] Appl. No.: 685,343

[22] Filed: Jul. 23, 1996

Related U.S. Application Data

[62] Division of Ser. No. 466,481, Jun. 6, 1995, abandoned, which is a division of Ser. No. 254,839, Jun. 6, 1994, abandoned.

[51] Int. Cl.$^6$ .................. B32B 5/24; B32B 17/10; D04H 3/12
[52] U.S. Cl. .................. 428/215; 428/216; 428/219
[58] Field of Search .................. 428/215, 216, 428/219, 220, 311.5, 316.6, 317.5, 317.7, 317.9, 337, 338, 339, 422, 448, 903

[56] References Cited

U.S. PATENT DOCUMENTS

| | | |
|---|---|---|
| Re. 30,984 | 6/1982 | Hipchen et al. . |
| 2,788,051 | 4/1957 | Tuttle . |
| 2,794,756 | 6/1957 | Leverenz . |
| 3,302,362 | 2/1967 | Lang . |
| 3,533,901 | 10/1970 | Sutker . |
| 3,788,923 | 1/1974 | Soliman . |
| 4,056,501 | 11/1977 | Gibbs et al. . |
| 4,091,142 | 5/1978 | Elmore et al. . |
| 4,118,533 | 10/1978 | Hipchen et al. . |
| 4,121,957 | 10/1978 | Allen . |
| 4,146,528 | 3/1979 | Theysohn et al. . |
| 4,188,428 | 2/1980 | Wolf . |
| 4,279,958 | 7/1981 | Ahmad . |
| 4,316,934 | 2/1982 | Maier et al. . |
| 4,346,133 | 8/1982 | Hipchen et al. . |
| 4,358,502 | 11/1982 | Dunbar . |
| 4,414,265 | 11/1983 | Rosato et al. . |
| 4,418,108 | 11/1983 | Lin . |
| 4,425,396 | 1/1984 | Hartman . |
| 4,438,166 | 3/1984 | Gluck et al. . |
| 4,496,415 | 1/1985 | Sprengling . |
| 4,637,951 | 1/1987 | Gill et al. . |
| 4,654,100 | 3/1987 | Yats et al. . |
| 4,698,258 | 10/1987 | Harkins, Jr. . |
| 4,753,837 | 6/1988 | Hanusa . |
| 4,764,420 | 8/1988 | Gluck et al. . |
| 4,804,425 | 2/1989 | Hoffman et al. . |
| 4,863,790 | 9/1989 | Horacek et al. . |
| 4,940,112 | 7/1990 | O'Neill . |
| 4,983,453 | 1/1991 | Beall . |
| 5,001,005 | 3/1991 | Blanpied . |
| 5,007,976 | 4/1991 | Satterfield et al. . |
| 5,102,728 | 4/1992 | Gay et al. . |
| 5,112,678 | 5/1992 | Gay et al. . |
| 5,202,071 | 4/1993 | Nakamura et al. . |
| 5,282,915 | 2/1994 | Westlake, Jr. . |

FOREIGN PATENT DOCUMENTS

| | | |
|---|---|---|
| 0005843 | 12/1979 | European Pat. Off. . |
| 0249842 | 12/1987 | European Pat. Off. . |
| 0697280 | 2/1996 | European Pat. Off. . |
| 2149538 | 3/1973 | France . |
| 2826729 | 2/1979 | Germany . |
| 57-18236 | 1/1982 | Japan . |
| 1-182036 | 7/1989 | Japan . |
| 2-36933 | 2/1990 | Japan . |
| 1343762 | 1/1974 | United Kingdom . |
| 1360557 | 7/1974 | United Kingdom . |
| 1582696 | 1/1981 | United Kingdom . |
| WO95/18710 | 7/1995 | WIPO . |

*Primary Examiner*—Richard Weisberger
*Attorney, Agent, or Firm*—C. Michael Gegenheimer; Inger H. Eckert

[57] ABSTRACT

A facer sheet is provided which is adapted to receive a prefoam mixture during a structural laminate forming process. The facer sheet comprises a first predominantly glass fiber mat having first and second outer surfaces and a polymeric material applied to the first outer surface of the mat. The polymeric material acts as a substantially impervious barrier to the liquid prefoam mixture received at the second outer surface of the mat during the structural laminate forming process.

8 Claims, 4 Drawing Sheets

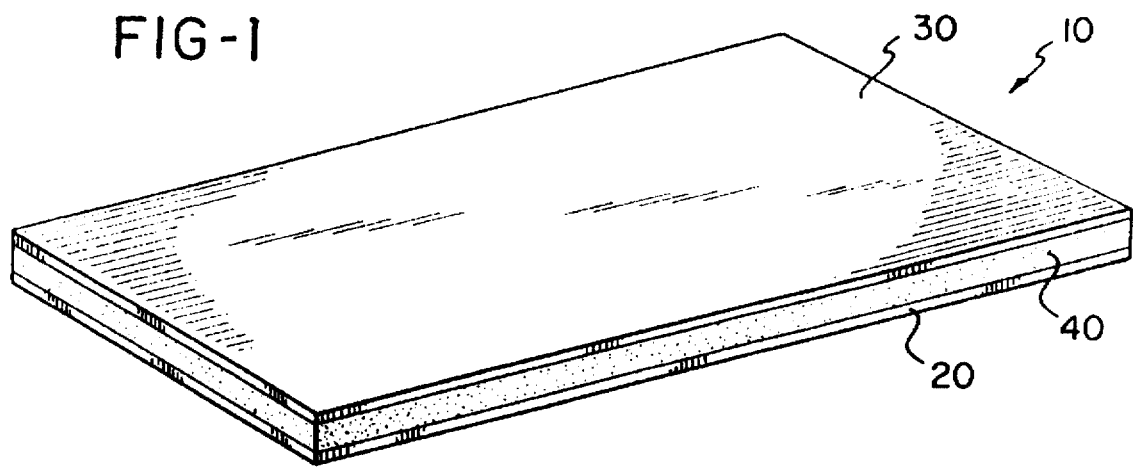

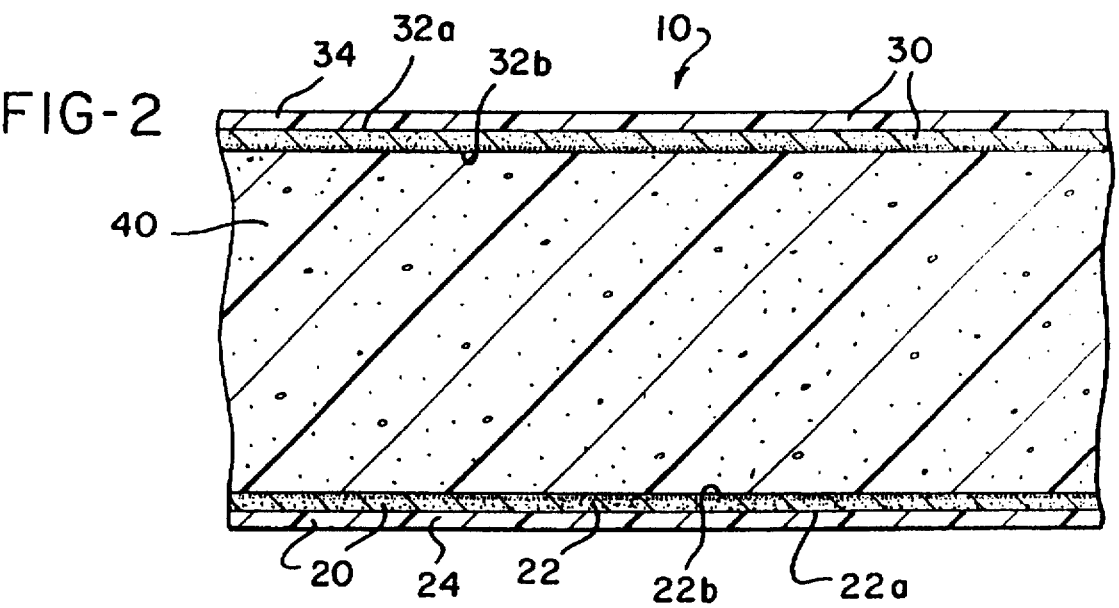
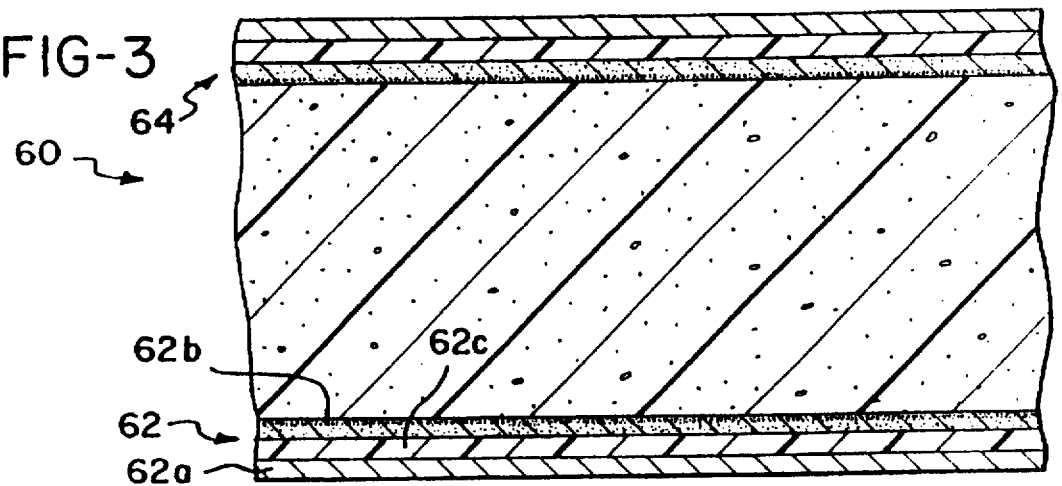

POLYMER COATED GLASS FIBER MAT

CROSS-REFERENCE TO RELATED APPLICATIONS

This is a division of U.S. patent application Ser. No. 08/466,481, filed Jun. 6, 1995, now abandoned, which is a division of U.S. patent application Ser. No. 08/254,839, filed Jun. 6, 1994, now abandoned.

BACKGROUND OF THE INVENTION

The present invention relates generally to glass fiber mats for use as facet sheets in structural laminates and, more particularly, to glass fiber mats coated with a polymeric material such that the polymeric material acts as a barrier to a liquid prefoam mixture applied to the mat during a structural laminate forming process.

Foam laminates have been used in the past by the construction industry as underlayment material installed beneath shingles, siding and the like. One such laminate comprises two facer sheets and a thermosetting foam material interposed between the two facer sheets. During production of the laminate, a liquid prefoam mixture is applied between the two facer sheets and expands during an exothermic reaction between the components of the prefoam mixture. The expansion takes place within a foam laminate forming apparatus such that a structural laminate having a predefined thickness is formed.

Facer sheets comprising glass fiber mats have previously been used in structural foam laminates. A glass fiber mat, in order to be used in a foam laminate, must have a porosity sufficiently low such that the liquid prefoam mixture applied during the laminate forming process does not pass completely through the mat. If the prefoam mixture passes completely through the mat, the foam laminate forming apparatus will malfunction. To prevent this from occurring, glass mat porosity has been reduced by adding fine fibers to the mat as well as providing a low energy surface to the fibrous mat by the application of an "anti-wicking agent" such as a fluorocarbon resin. The fluorocarbon resin inhibits penetration of the prefoam mixture into the glass mat. However, the fluorocarbon resin may also adversely affect the foam adjacent to the facer sheet resulting in failure through delamination at the foam-facer sheet interface with time.

U.S. Pat. No. 5,001,005 discloses a facing sheet comprising glass fibers, a non-glass filler material such as clay, mica, talc, limestone, etc., and a non-asphaltic binder material. U.S. Pat. No. 5,102,728 discloses a mat comprising a glass substrate coated with an aqueous mixture of a mineral pigment, a latex adhesive material, and an asphalt emulsion material. U.S. Pat. No. 5,112,678 discloses a mat comprising a glass substrate coated with an aqueous mixture of a mineral pigment, a polymer latex adhesive material, and inorganic adhesive material. Because the coatings on these mats tend to be brittle, the above-mentioned facing sheet and mats tend to crack and have low puncture resistance.

Accordingly, there is a need for an improved facer sheet which is pliable, bonds well with foam material, and does not allow a liquid prefoam mixture to pass completely therethrough.

SUMMARY OF THE INVENTION

With the present invention, an improved facer sheet is provided which is pliable, bonds well with foam material, and includes a coating of a polymeric material which acts as a barrier to a prefoam mixture applied to the facer sheet during a foam laminate forming process.

In accordance with a first aspect of the present invention, a facet sheet is provided which is adapted to receive a prefoam mixture during a structural laminate forming process. The facer sheet comprises a first predominantly glass fiber mat having first and second outer surfaces and a polymeric material on one of the first and second outer surfaces. The polymeric material acts as a substantially impervious barrier to the liquid prefoam mixture received at the second outer surface during the structural laminate forming process.

The polymeric material may be selected from the group consisting essentially of polypropylene, polyethylene, and blends and mixtures thereof. The polymeric material may also consist essentially of copolymers of ethylene and/or propylene with other comonomers such as ethylenically-unsaturated $C_{4-8}$ hydrocarbons, acrylic and methacrylic acid, styrene, vinyl acetate, and blends and mixtures thereof. Other suitable thermoplastic polymers include polyesters, polystyrenes, polycarbonates, polyamides, as well as blends and mixtures thereof.

In a second embodiment of the present invention, the facer sheet further comprises a second predominantly glass fiber mat positioned adjacent to the polymeric material on the side of the polymeric material opposite to the first mat. The polymeric material acts as a tie layer between the first and second mats.

The predominantly glass fiber mat preferably comprises discrete glass fibers and a binder for bonding the fibers to one another. For example, a preferred binder is a mixture of a urea-formaldehyde resin, and a styrene-butadiene-acrylate copolymer. The urea-formaldehyde resin is present in an amount from about 50% to about 99% by dry weight of the mixture, and is preferably present in an amount of about 70% by dry weight. The styrene-butadiene-acrylate copolymer is present in an amount from about 1% to about 50% by dry weight of the mixture, and is preferably present in an amount of about 30% by dry weight.

In accordance with a second aspect of the present invention, a method is provided for producing a facet sheet adapted to receive a liquid prefoam mixture during a structural laminate forming process. The method comprises the steps of: providing a first predominantly glass fiber mat having first and second outer surfaces; and, applying a polymeric material onto the first outer surface of the mat such that the polymeric material forms a substantially impervious barrier to the liquid prefoam mixture received during the structural laminate forming process.

The step of applying a polymeric material onto the first outer surface of the mat is performed by extruding a polymeric material onto the first outer surface. Alternatively, the step of applying a polymeric material onto the first outer surface of the mat may be performed by laminating a film of the polymeric material onto the first outer surface.

In accordance with a third aspect of the present invention, a foam laminate is provided for installation as underlayment material beneath shingles, siding and the like. The foam laminate comprises at least one facer sheet comprising a first predominantly glass fiber mat having first and second outer surfaces, and a polymeric material on the first outer surface. Also provided is a rigid foam material layer integrally attached to the mat and the polymeric material and extending into the mat from the second outer surface thereof.

Accordingly, it is an object of the present invention to provide an improved facer sheet for use in foam laminates.

It is another object of the present invention to provide an improved method for forming facer sheets for use in structural laminates. It is a further object of the present invention to provide an improved foam laminate for use as underlayment beneath shingles, siding and the like. These and other objects and advantages of the present invention will be apparent from the following description, the accompanying drawings, and the appended claims.

BRIEF DESCRIPTION OF THE DRAWINGS

FIG. 1 is a perspective view of a structural laminate having facer sheets constructed in accordance with a first embodiment of the present invention;

FIG. 2 is a schematic sectional side view of a portion of the laminate shown in FIG. 1;

FIG. 3 is a schematic sectional side view of a portion of a laminate having facer sheets constructed in accordance with a second embodiment of the present invention;

DETAILED DESCRIPTION OF THE INVENTION

Figure 4:
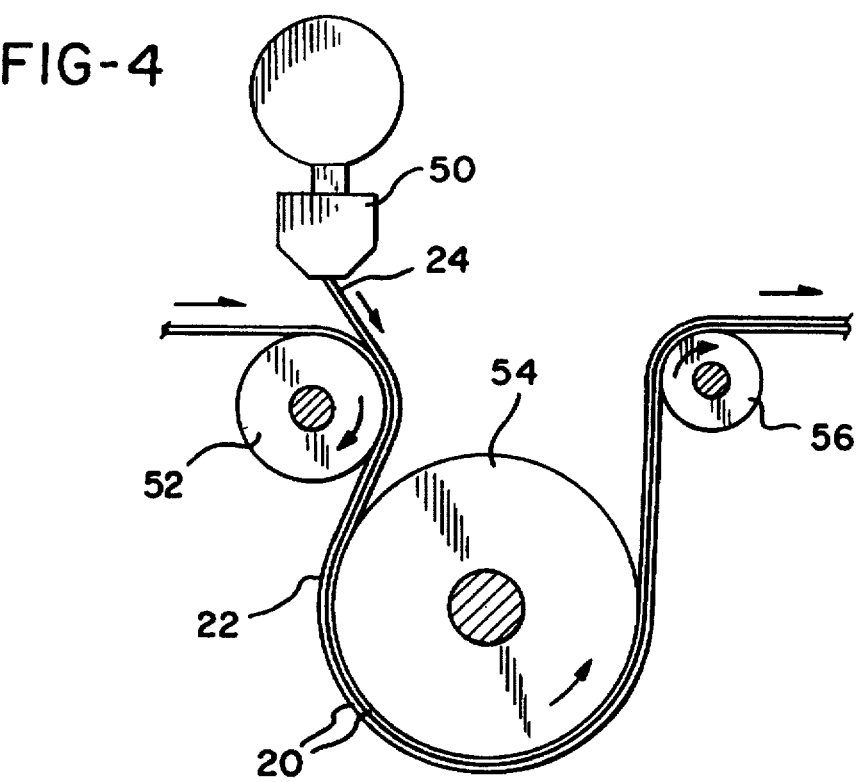
FIGS. 4 and 5 are schematic illustrations of apparatus for extruding polymeric material onto a glass fiber mat to form one of the two facer sheets illustrated in FIG. 2; and, FIGS. 6 and 7 are schematic illustrations of apparatus for extruding polymeric material onto a first glass fiber mat to form one of the two facer sheets illustrated in FIG. 3.

In FIG. 1, a structural laminate 10 constructed in accordance with a first embodiment of the present invention is illustrated and comprises first and second facet sheets 20 and 30 and a foam layer 40 interposed between the first and second facer sheets 20 and 30. The structural laminate 10 is adapted for use as underlayment beneath roofing shingles, siding and the like. The laminate 10 may also be used for other structural treatment applications.

The first facer sheet 20 comprises a first predominantly glass fiber mat 22 having first and second outer surfaces 22a and 22b, see FIG. 2. Provided on the first outer surface 22a is a layer of polymeric material 24 which acts as a substantially impervious barrier to liquid prefoam mixture received at the second outer surface 22b when the structural laminate 10 is formed.

The glass fiber mat 22 preferably has a weight basis between 1.4 and 2.5 lbs/100 ft$^2$. The mat 22 is formed from discrete glass fibers which are approximately 0.5 inch to 1.5 inches in length and have a diameter between about 13.5 and 19 microns. A binder is provided for bonding the glass fibers to one another and may include, for example, an acrylic resin, a urea-formaldehyde resin or a styrene-butadiene-acrylate modified urea-formaldehyde resin. A glass fiber mat 22 having a styrene-butadiene-acrylate modified urea-formaldehyde resin binder is commercially available from Owens-Corning Fiberglas Corporation and is sold under the trademark OCmat 2115.

The polymeric material layer 24 is preferably a thermoplastic polymer. Suitable polymers include polyolefins such as polyethylene; polypropylene; and copolymers of ethylene and/or propylene with other comonomers such as ethylenically-unsaturated $C_{4-8}$, hydrocarbons, acrylic and methacrylic acid, styrene, vinyl acetate; and blends and mixtures thereof. Other suitable thermoplastic polymers include polyesters, polystyrenes, polyamides, and polycarbonates, as well as blends and mixtures thereof.

The polymeric material layer 24 may include a commercially available dye or pigment such as titanium dioxide, a UV stabilizer and/or a commercially available flame retardant. One such flame retardant is commercially available from Techner P.M., Clinton, Tenn., under the product name F/R Concentrate and product code PM1346E4. A second flame retardant is commercially available from Advanced Compounding, a division of Blessings Corp., under the product name FRX 8701 LD.

As shown in FIG. 4, the polymeric material layer 24 is extruded onto the glass fiber mat 22 via a conventional hot-film extruder 50. A conventional vacuum roller 52 is provided which engages the mat 22 and acts to pull the molten polymeric material 24 into the mat 22. A sufficient thickness of the polymer is applied so that upon cooling, a liquid impervious layer is formed. From the vacuum roller 52, the coated mat 22 passes around a chill roller 54 which serves to cool the polymeric material 24. The coated mat 22 then passes over a guide roller 56 and travels to a winder device (not shown) where it is wound into roll form.

Figure 5:
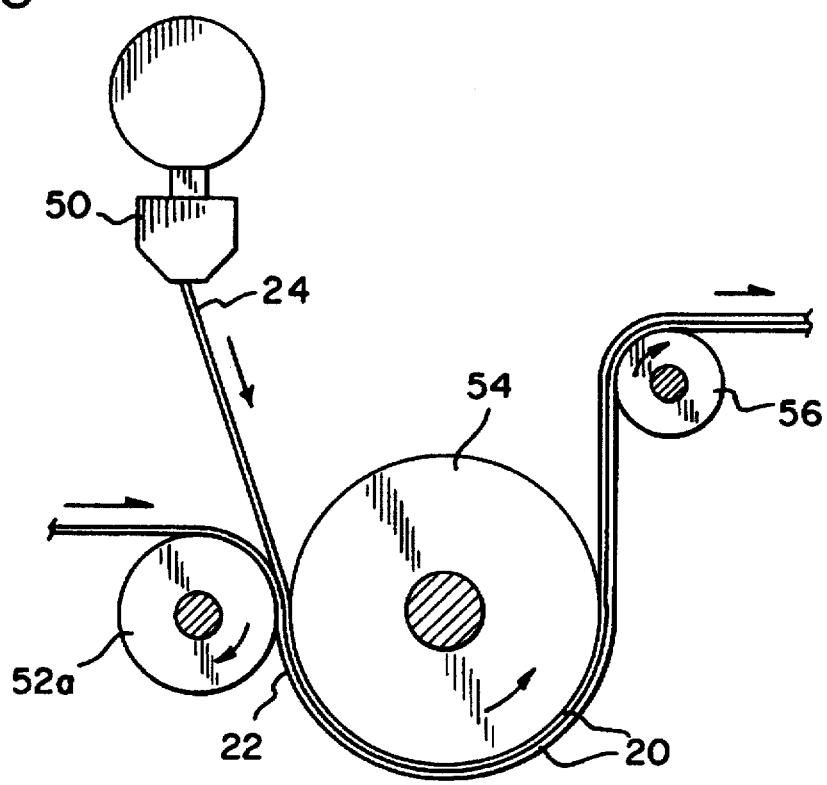

In an alternative embodiment shown in FIG. 5, where like reference numerals indicate like elements, a conventional pressure roller 52a is provided which engages the mat 22 and acts to force molten polymeric material 24 extruded from the extruder 50 into the mat 22 by contacting chill roller 54. From the pressure roller 52a, the coated mat 22 continues around the chill roller 54, which serves to cool the polymeric material 24.

Alternatively, the polymeric material layer 24 may be laminated onto the mat 22. For example, a hot melt adhesive such as an adhesive film, examples of which are commercially available from The Dow Chemical Co. under the product names of DAF 709 and DAF 899, may be used to adhere another polyolefin film or like thermoplastic film to the mat 22. Each of the two Dow adhesive films consists essentially of a combination of polyethylene, a copolymer of ethylene and acrylic acid, a copolymer of ethylene and butene-1, and silicon dioxide. It is also contemplated that the polymeric material layer 24 may comprise a commercially available poly (vinyl chloride) film which is adhered to the mat 22 via a pressure sensitive adhesive coated on the film.

The second facer sheet 30 comprises a predominantly glass fiber mat 32 having first and second outer surfaces 32a and 32b, and a polymeric material layer 34 applied to the first outer surface 32a of the mat 32. The glass fiber mat 32 and the polymeric material 34 are formed from essentially the same materials and combined in essentially the same manner as the glass fiber mat 22 and the polymeric material layer 24 of the first facet sheet 20.

Foam layer 40 may be formed using a well-known urethane modified polyisocyanurate prefoam mixture which is applied between the first and second facer sheets 20 and 30 and expands during an exothermic reaction between the components of the mixture. The expansion takes place within a heated portion of a conventional foam laminate forming apparatus (not shown). The prefoam mixture penetrates essentially completely through the mats 22 and 32 until it reaches the polymeric material barrier layers 24 and 34. The foam layer 40, upon curing, achieves good mechanical and chemical bonds with the facer sheets 20 and 30.

In accordance with a second embodiment of the present invention, a structural laminate 60 is formed having first and second facer sheets 62 and 64, see FIG. 3. The first facer sheet 62 comprises first and second predominantly glass fiber mats 62a and 62b and a layer of polymeric material 62c interposed between the first and second mats 62a and 62b. The layer of polymeric materials 62c serves to bond the first and second mats 62a and 62b to one another and forms a liquid impervious layer within the facer sheet 62, see FIG. 6. The polymeric material 62c may comprise any of the thermoplastic materials or films previously noted. For example, it may comprise one of the two adhesive films set out above.

Figure 6:
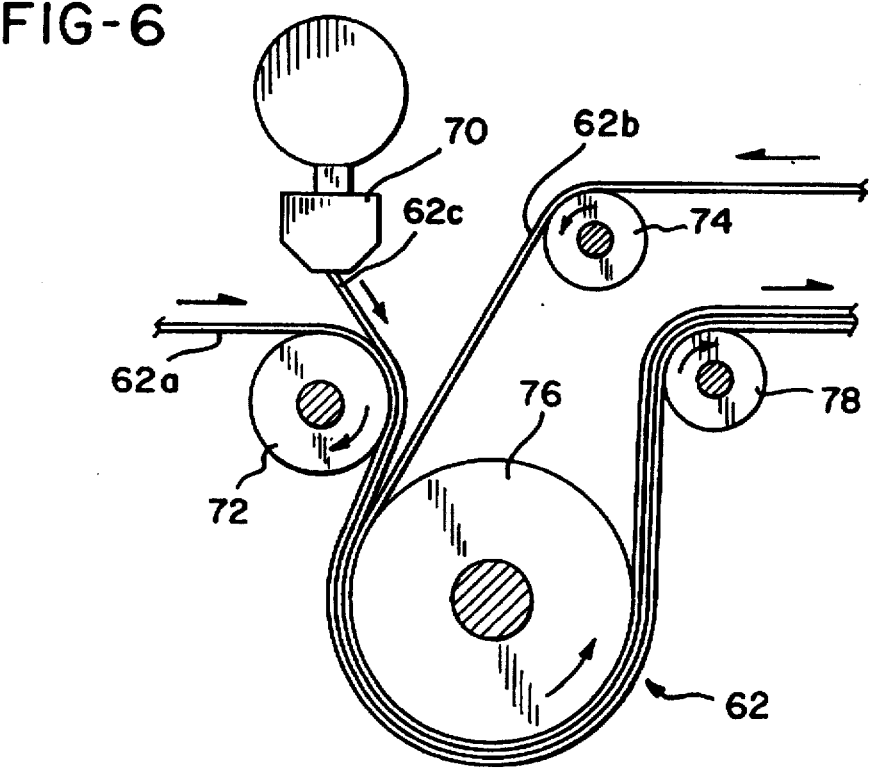

In FIG. 6, the polymeric material 62c is applied onto the first mat 62a via a conventional hot-film extruder 70. The coated mat 62a passes adjacent to a conventional vacuum roller 72 which acts to pull the polymeric material 62c into the first mat 62a. The second mat 62b, after passing over a guide roller 74, is combined with the first mat 62a and the polymeric material 62c. The combined first and second mats 62a and 62b and polymeric material 62c pass around a chill roller 76 which serves to cool the polymeric material 62c. The facer sheet 62 then passes over a guide roller 78 and proceeds to a winder device (not shown).

Figure 7:
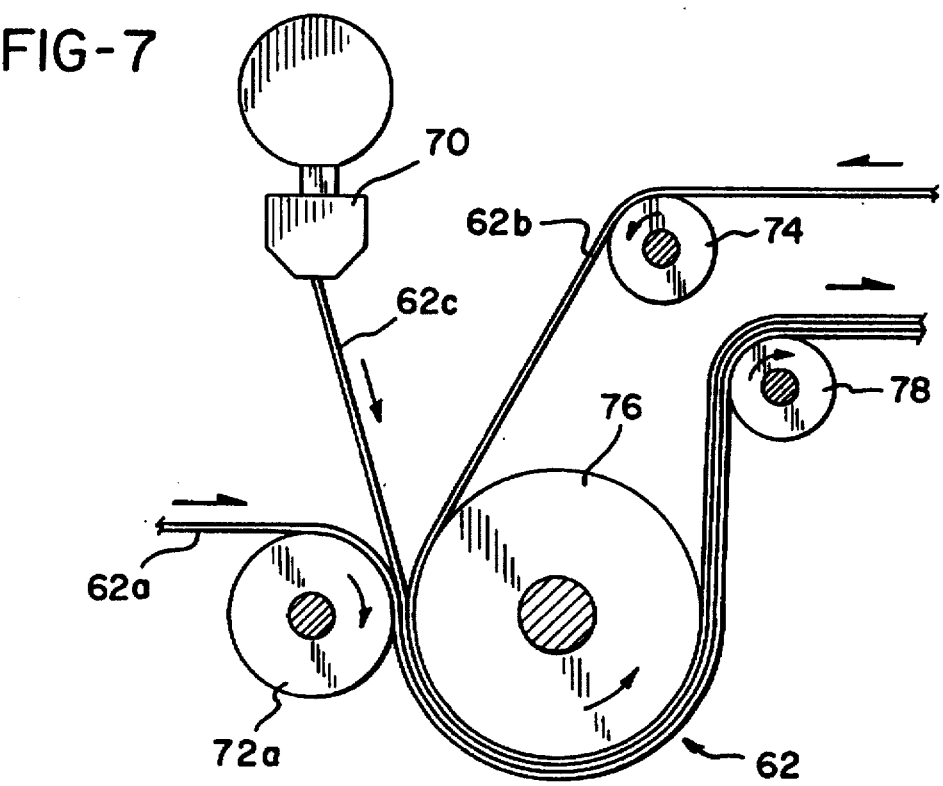

In an alternative embodiment shown in FIG. 7, where like reference numerals indicate like elements, a conventional pressure roller 72a is provided which engages the first and second mats 62a and 62b and acts to force the molten polymeric material 62c extruded from the extruder 70 into the mats 62a and 62b by contacting chill roller 76. From the pressure roller 72a, the first and second mats 62a and 62b and polymeric material 62c continue around the chill roller 76, which serves to cool the polymeric material 62c.

It is further contemplated that when the polymeric material 62c comprises one of the two previously noted adhesive films, laminating may be effected via a conventional hot-roll laminating process.

The second facer sheet 64 is formed from essentially the same materials and in essentially the same manner as the first facer sheet 62.

The following examples are given to illustrate certain preferred details of the invention, it being understood that the details of the examples are not to be taken as in any way limiting the invention thereto.

EXAMPLE 1

A mat substrate was constructed from discrete glass fibers having a length of approximately 1.25 inches and a diameter of approximately 16 microns. The binder for bonding the glass fibers to one another was formed from a mixture of the following materials: a urea-formaldehyde resin (commercially available from Borden Packaging & Industrial Products under the trademark Casco Resin® FG-345), urea, water, a defoamer (commercially available from Drew Industrial Division, Ashland Chemical, Inc. under the trademark Drewplus L 139 Foam Control Agent), ammonia, and a styrene-butadiene-acrylate copolymer (commercially available from The Dow Chemical Co. under the product name LATEX DL 485NA). Those materials were mixed as follows:

1) 5102 pounds of the Dow LATEX DL 485NA (46% dry solids) was added to a main mix tank (agitation was initiated when this material was added to the main tank and occurred throughout mixing);
2) 23 pounds of the defoamer was added to the main mix tank;
3) 117 pounds of a solution including by weight approximately 35% of urea and 65% of water was added to the main mix tank;
4) 8127 pounds of the UF resin (66% dry solids) was added to the main mix tank;
5) 100 pounds of ammonia was added to the main mix tank;
6) water was added until 16,160 pounds of total mixture was obtained;
7) the pH of the mixture was adjusted with ammonia to be within the range of 7.0 and 7.5; and
8) the main mix tank was drained to a distribution tank and the main mix tank was flushed with approximately 500 pounds of water which was combined with the mixture. The mixture was stored at 75° F.±10° F. with mild agitation.

The glass fibers and binder were combined via a conventional wet-forming process. The resultant mat had a weight basis of approximately 1.8 lbs./100 ft$^2$ and a binder content of approximately 20%.

A 1.5 mil thick polymeric material layer was extruded via a conventional hot-melt extruder onto the mat to form facer sheet material. The polymeric layer included by weight approximately 84% of low density polyethylene, 15% of titanium dioxide concentrate (pellets comprising 50% TiO$_2$ in low density polyethylene) and 1% of a conventional UV stabilizer. Those materials were mixed together before entering the extruder. The resultant facer sheet material had a total thickness of approximately 24 mils.

EXAMPLE 2

A 1.4 lbs./100 ft$^2$ mat was used in this example. The mat was constructed in essentially the same manner and from the same materials as the one set out in Example 1. A flame-retarded resin layer was extruded onto the mat via a conventional hot-melt extruder to form facer sheet material. The resin layer included by weight approximately 70% of polypropylene, 10% of low density polyethylene, and 20% of a flame retardant (which is commercially available from Techner P.M., Clinton, Tenn., under the product name F/R Concentrate and product code PM1366E4). The resultant facer sheet material had a total thickness of approximately 21 mils. The facer sheet material was cut into lengths. Two such lengths were incorporated into a 1.0 inch structural foam laminate.

It is also contemplated that the 10% by weight of low density polyethylene used in Example 2 may be replaced by 10% by weight of titanium dioxide.

It is further contemplated by the present invention that the polymeric material may be applied to a glass fiber mat on the surface of the mat which receives the prefoam mixture. For example, one of the two previously noted adhesive films, each of which has a softening point in the range of from about 85° to 100° C., may be extruded onto the inner surface of a glass fiber mat. During foam expansion, the adhesive film softens such that it is stretched by the expanding foam material into the mat structure. The foam achieves both good mechanical and chemical bonds with the facer sheet.

Having described the invention in detail and by reference to preferred embodiments thereof, it will be apparent that modifications and variations are possible without departing from the scope of the invention defined in the appended claims.

We claim:

1. A facer sheet adapted to receive a prefoam mixture during a structural laminate forming process, said facer sheet comprising:

a first predominantly glass fiber mat having first and second outer surfaces; and a polymeric material on said first outer surface of said mat such that said polymeric material acts as a substantially impervious barrier to the liquid prefoam mixture received at said second outer surface during the structural laminate forming process.

2. A facer sheet as set forth in claim 1, wherein said polymeric material is selected from the group consisting of polypropylene, polyethylene, and blends and mixtures thereof.

3. A facer sheet as set forth in claim 1, wherein said polymeric material comprises a member selected from the group consisting of polyethylene; polypropylene; copolymers of ethylene and/or propylene with other comonomers; polyesters; polyamides; polystyrenes; polycarbonates; and blends and mixtures thereof.

4. A facer sheet as set forth in claim 1, further comprising a second predominantly glass fiber mat positioned adjacent to said polymeric material on the side of said polymeric material opposite to said first mat, and said polymeric material acting as a tie layer between said first and second mats.

5. A facer sheet as set forth in claim 1, wherein said predominantly glass fiber mat comprises discrete glass fibers and a binder for bonding said fibers to one another.

6. A facer sheet as set forth in claim 5, wherein said binder consists essentially of a mixture of a urea-formaldehyde resin, a styrene-butadiene-acrylate copolymer, and water.

7. A facer sheet as set forth in claim 1, wherein said polymeric material comprises a thermoplastic polymer and a flame retardant.

8. A facer sheet as set forth in claim 3, wherein said comonomers are selected from the group consisting of ethylenically-unsaturated $C_{4-8}$ hydrocarbons, acrylic and methacrylic acids, styrene, and vinyl acetate.

* * * * *